United States Patent
Seynaeve et al.

[11] Patent Number: 6,131,893
[45] Date of Patent: Oct. 17, 2000

[54] HYDRAULIC ANTIVIBRATION SUPPORT CLOSED BY A CRIMPED INSERT

[75] Inventors: Stéphane Seynaeve, Grand Rapids, Mich.; Gilles Sauvat, Cloyes sur Loir, France; Jean Lor, Chateaudun, France; Pascal Petit, Chaincy, France

[73] Assignee: Hutchinson, Paris, France

[21] Appl. No.: 09/122,820

[22] Filed: Jul. 27, 1998

[30] Foreign Application Priority Data

Aug. 1, 1997 [FR] France ................................ 97 09876

[51] Int. Cl.$^7$ .......................................................... F16F 9/34
[52] U.S. Cl. .................................. 267/140.13; 207/140.11
[58] Field of Search ........................ 207/140.11, 140.12, 207/140.13, 140.14, 219, 220, 141; 248/636

[56] References Cited

U.S. PATENT DOCUMENTS

| | | | |
|---|---|---|---|
| 4,607,828 | 8/1986 | Bodin et al. | 207/140.11 |
| 4,958,810 | 9/1990 | Gold et al. | 207/140.13 |
| 5,009,403 | 4/1991 | Kato et al. | 207/140.13 |
| 5,009,404 | 4/1991 | Hirazawa | 207/140.13 |
| 5,018,699 | 5/1991 | Bretaudeau et al. | 248/562 |

FOREIGN PATENT DOCUMENTS

| | | | |
|---|---|---|---|
| 0 378 464 | 7/1990 | European Pat. Off. | F16F 13/00 |
| 0 497 708 | 8/1992 | European Pat. Off. | F16F 13/00 |
| 62003920 | 1/1987 | Japan | B29C 47/00 |
| 2 268 566 | 1/1994 | United Kingdom | F16F 13/00 |

*Primary Examiner*—Matthew C. Graham
*Attorney, Agent, or Firm*—Marshall, O'Toole, Gerstein, Murray & Borun

[57] ABSTRACT

A hydraulic antivibration support has two rigid strength members with at least the first strength member having an aluminum body. The strength members are connected to each other by an elastomer body which defines a first hydraulic chamber belonging to a liquid-filled hydraulic assembly, said hydraulic assembly being closed in sealed manner by a closure element crimped by means of a steel insert which is partially embedded in the aluminum body of the first strength member.

7 Claims, 1 Drawing Sheet

HYDRAULIC ANTIVIBRATION SUPPORT CLOSED BY A CRIMPED INSERT

FIELD OF THE INVENTION

The present invention relates to hydraulic antivibration supports.

More particularly, the invention relates to a hydraulic antivibration support to be interposed between two rigid elements to damp vibration between said two elements, the support comprising:

first and second rigid strength members suitable for being secured respectively to the two rigid elements that are to be united; and an elastomer body having a thick wall interconnecting the two rigid strength members and defining at least a part of a first hydraulic chamber which itself forms a part of a liquid-filled hydraulic assembly, said hydraulic assembly being closed in sealed manner by a closure element held in place by crimping at least one steel retention member belonging to the first strength member.

BACKGROUND OF THE INVENTION

Such a hydraulic antivibration support is disclosed, for example, in document EP-A-0 497 708 in which the first strength member is a stamping made entirely out of steel.

Known hydraulic antivibration supports of that type give full satisfaction, but they nevertheless suffer from limitations concerning the shape of the first strength member, given the method used for manufacturing it.

When said first strength member is to be relatively complex in shape, it is necessary to build it up from a plurality of parts that are assembled together, thereby increasing the cost of the antivibration support.

To avoid making the first strength member from a plurality of parts, it is also known to cast it in the form of a single piece of aluminum alloy.

However, given that ordinary aluminum alloys have elongation characteristics that are insufficient for providing crimping under good conditions, it is then necessary to use special aluminum alloys and/or special crimping methods, thereby also increasing the cost of the antivibration support.

OBJECTS AND SUMMARY OF THE INVENTION

A particular object of the present invention is to mitigate those drawbacks.

To this end, according to the invention, in a hydraulic antivibration support of the kind in question the first strength member comprises an aluminum-based metal body overmolded on at least one steel insert part of which projects from said metal body and constitutes said retention member.

By means of these dispositions, it is easy to make the first strength member of the antivibration support in the form of a single piece, e.g. a casting of ordinary aluminum alloy, since it is the steel insert that is crimped and not the body based on aluminum of said first strength member. It thus possible, where appropriate, to obtain a complex shape for said first strength member without excessively increasing the cost of the antivibration support.

In preferred embodiments of the invention use may optionally also be made of one or more of the following dispositions:

the thick wall of the elastomer body is in the form of a bell extending along a central axis between an annular base and an end secured to the second strength member, the body of the first strength member having an annular portion which is centered on said axis and on which the base of the thick wall of the elastomer body is bonded, and the insert of said first strength member is an annulus which is centered on said axis and which projects from the annular portion of the body of the first strength member away from the thick wall of the elastomer body;

the body of the first strength member has at least one bracket-forming rigid arm extending from the annular portion of said body to a fixing zone including means for securing the first strength member to one of the two rigid elements to be united;

the hydraulic assembly further comprises a second hydraulic chamber which communicates with the first hydraulic chamber via a narrow channel and which is separated from said first chamber by a rigid partition disposed perpendicularly to said central axis, the second hydraulic chamber being defined by a flexible elastomer membrane which covers said rigid partition on its side remote from the thick wall of the elastomer body, the rigid partition and the membrane being secured to the first strength member by crimping the steel annulus of said first strength member;

the insert has a crimped outer portion and an inner portion which extends inside the metal body of the first strength member substantially at right angles relative to said outer portion;

the inner portion of the insert has a retention member which projects laterally from said inner portion to anchor the insert in the body of the first strength member; and the inner portion of the insert has a folded-over portion which constitutes said retention member.

BRIEF DESCRIPTION OF THE DRAWING

Other characteristics and advantages of the invention appear from the following description of an embodiment, given by way of non-limiting example and with reference to the accompanying drawing.

In the drawing.

MORE DETAILED DESCRIPTION

In the figures, the same references designate elements that are identical or similar.

Figure 1:
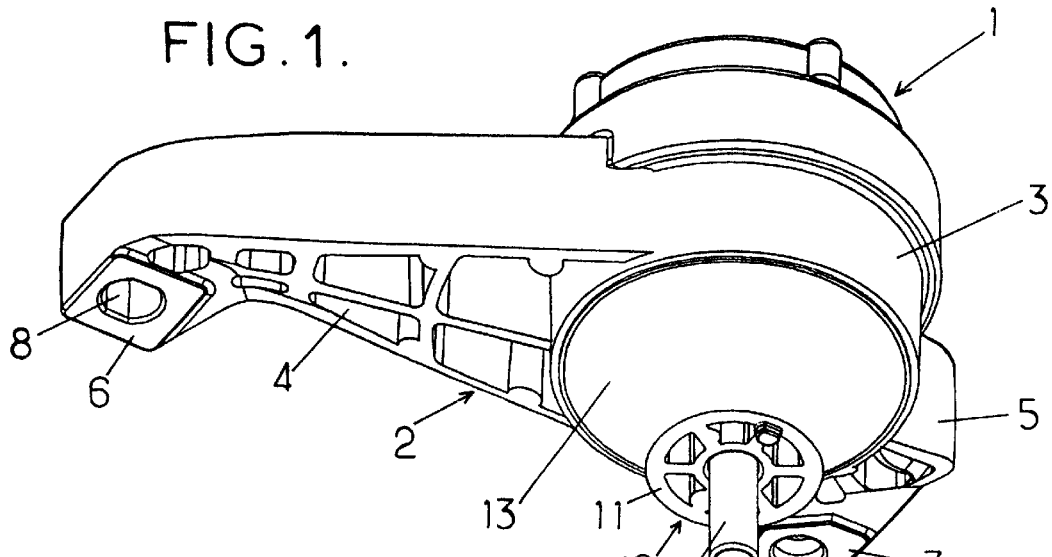
FIG. 1 is a perspective view seen from below of a hydraulic antivibration support constituting an embodiment of the invention.
Figure 2:
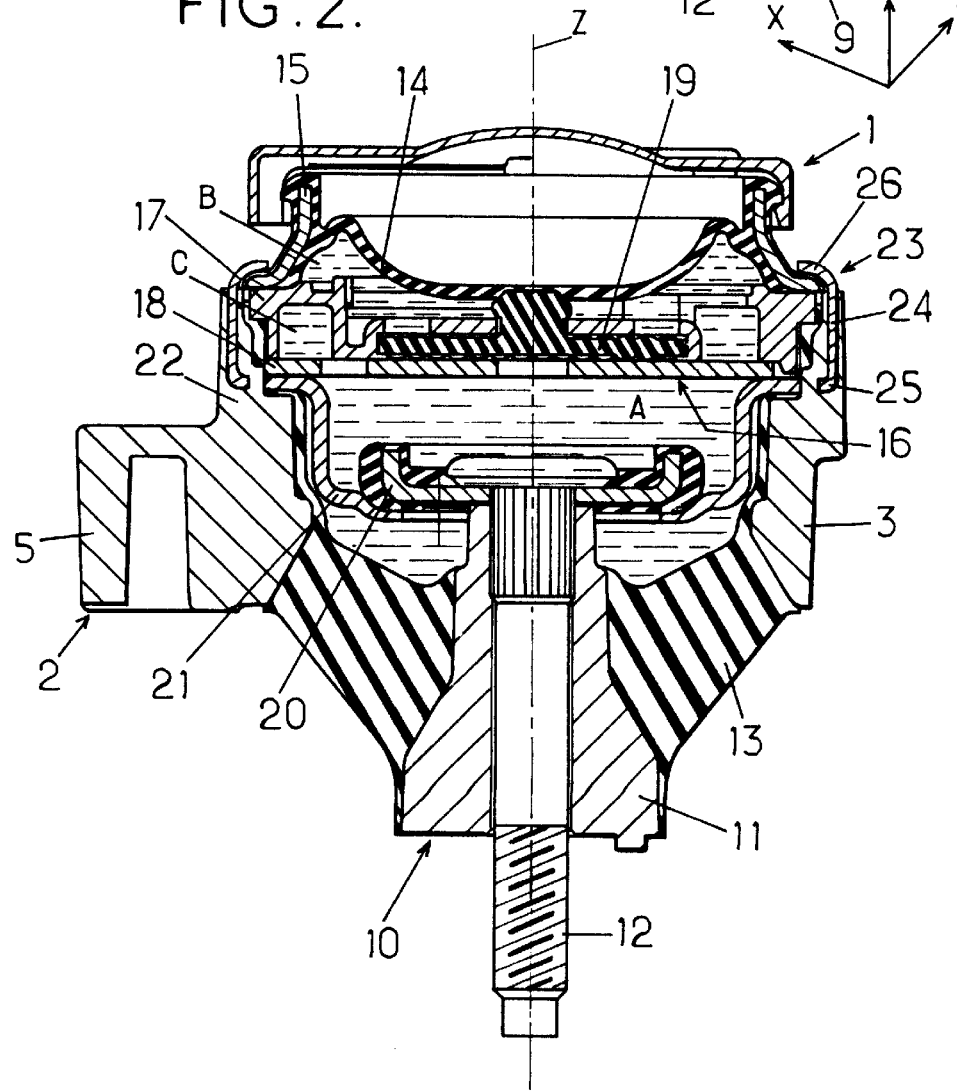
FIG. 2 is a vertical section view through the FIG. 1 antivibration support.

The hydraulic antivibration support 1 shown in FIGS. 1 and 2 is designed to be interposed between two rigid elements such as the structure and the engine of a vehicle for the purposes of supporting the engine while simultaneously damping and filtering vibration between those two elements, essentially along a vertical axis Z, and optionally also along horizontal axes X and Y.

To this end, the antivibration support comprises:

a first rigid strength member 2 which comprises a ring 3 which is circularly symmetrical about the axis Z, said ring 3 being extended outwards by two arms 4 and 5 acting as brackets which extend to plates 6 and 7 provided with fixing holes 8 and 9 and designed in the present case to be fixed to the power unit of the vehicle;

a second rigid metal strength member 10 constituted, for example, by a central stud 11 extended downwards by a bolt 12 for fixing in the present case to the structure of the vehicle (naturally, the strength member 10 could be fixed to the power unit and the strength member 2 to the structure of the vehicle, in which case the antivibration support would be upside-down relative to the disposition shown in the drawings, with its bolt 12 pointing upwards);

an elastomer body 13 connecting the two strength members 2 and 10 together in sealed manner, the body comprising a bell-shaped thick wall that is circularly symmetrical about the axis Z, said thick wall flaring upwards from an end which is bonded to the stud 11 as far as an annular base which is bonded to the ring 3;

a flexible elastomer membrane 14 forming an easily-deformable bellows whose periphery is overmolded onto a metal reinforcing ring 15, said membrane covering the ring 3 at its end remote from the elastomer body 13 and being fixed in sealed manner to said ring 3 by crimping so as to co-operate with the ring 3 and the elastomer body 13 to define a leakproof housing that is filled with liquid;

a rigid partition 16 disposed radially and subdividing said housing into a working chamber A adjacent to the elastomer body 13 and a compensation chamber B adjacent to the membrane 14, these two chambers communicating with each other via a narrow channel C formed in said partition so as to enable liquid to be transferred between the chambers A and B to damp vibratory movements of relatively large amplitude and relatively low frequency between the strength members 2 and 10, with the partition 16 in the present case being made of two parts 17 and 18 which form two central grids on either side of the partition and which hold captive between them, with a small amount of clearance, a decoupling valve member 19 made of elastomer and suitable for filtering vibration of relatively low amplitude and relatively high frequency between the strength members 2 and 10; and an abutment 20 which extends radially inside the working chamber A and which is secured to the strength member 10, said abutment co-operating firstly with the partition 12 and secondly with a perforated counter-abutment plate 21 for limiting relative displacement between the two strength members 2 and 10 along the axis Z.

According to the invention, the strength member 2 comprises a body 22 cast out of ordinary aluminum alloy, and including both the ring 3 and the arms 4 and 5, which casting is overmolded onto a steel insert 23.

In the example shown, the insert 23 is in the form of a circularly cylindrical ring about the axis Z and comprises:

firstly an internal portion 24 extending axially inside the aluminum alloy body 22 to a bottom end 25 which is preferably folded radially inwards to anchor the insert 23 in the body 22 (this folded end could be replaced by any other retention member projecting radially inwards or radially outwards inside the body 22); and an outer portion 26 projecting axially upwards and which is folded radially inwards by crimping onto the reinforcing ring 15 of the membrane 14 so as to clamp the perimeter of said membrane 14, the two parts 17 and 18 of the partition 16, and the perforated plate 21 axially against shoulders formed inside the ring 3.

The strength member 2 can thus be made as a single piece without requiring expensive, special alloys to be used.

We claim:

1. A hydraulic antivibration support to be interposed between two rigid elements to damp vibration between said two elements, the support comprising:

first and second rigid strength members for being secured respectively to the two rigid elements that are to be united; and an elastomer body having a thick wall interconnecting the two rigid strength members and defining at least a part of a first hydraulic chamber which itself forms a part of a liquid-filled hydraulic assembly, said hydraulic assembly being closed in sealed manner by a closure element held in place by crimping at least one steel retention member belonging to the first strength member;

wherein the first strength member comprises an aluminum-based metal body overmolded on at least one steel insert part of which projects from said metal body and constitutes said retention member.

2. A hydraulic antivibration support according to claim 1, in which the thick wall of the elastomer body is in the form of a bell extending along a central axis between an annular base and an end secured to the second strength member, the body of the first strength member having an annular portion which is centered on said axis and on which the base of the thick wall of the elastomer body is bonded, and the insert of said first strength member is an annulus which is centered on said axis and which projects from the annular portion of the body of the first strength member away from the thick wall of the elastomer body.

3. A hydraulic antivibration support according to claim 2, in which the body of the first strength member has at least one bracket-forming rigid arm extending from the annular portion of said body to a fixing zone including means for securing the first strength member to one of the two rigid elements to be united.

4. A hydraulic antivibration support according to claim 2, in which the hydraulic assembly further comprises a second hydraulic chamber which communicates with the first hydraulic chamber via a narrow channel and which is separated from said first chamber by a rigid partition disposed perpendicularly to said central axis, the second hydraulic chamber being defined by a flexible elastomer membrane which covers said rigid partition on its side remote from the thick wall of the elastomer body, the rigid partition and the membrane being secured to the first strength member by crimping the steel annulus of said first strength member.

5. A hydraulic antivibration support according to claim 1, in which the insert has a crimped outer portion and an inner portion which extends inside the metal body of the first strength member substantially at right angles relative to said outer portion.

6. A hydraulic antivibration support according to claim 5, in which the inner portion of the insert has a retention member which projects laterally from said inner portion to anchor the insert in the body of the first strength member.

7. A hydraulic antivibration support according to claim 6, in which the inner portion of the insert has a folded-over portion which constitutes said retention member.

* * * * *